United States Patent
Perry et al.

(10) Patent No.: US 6,865,213 B2
(45) Date of Patent: Mar. 8, 2005

(54) DIODE-PUMPED SOLID-STATE LASER IN A POLYHEDRONAL GEOMETRY

(75) Inventors: Michael D. Perry, Poway, CA (US); Paul S. Banks, San Marcos, CA (US)

(73) Assignee: General Atomics, San Diego, CA (US)

( * ) Notice: Subject to any disclaimer, the term of this patent is extended or adjusted under 35 U.S.C. 154(b) by 0 days.

(21) Appl. No.: 09/801,428

(22) Filed: Mar. 7, 2001

(65) Prior Publication Data

US 2002/0191662 A1 Dec. 19, 2002

(51) Int. Cl.$^7$ .............................. H01S 3/093; H01S 3/04
(52) U.S. Cl. ........................... 372/72; 372/92; 372/34; 372/6; 372/66; 372/75
(58) Field of Search ................... 372/72, 92, 34, 372/6, 66, 75, 70

(56) References Cited

U.S. PATENT DOCUMENTS

| | | | |
|---|---|---|---|
| 4,578,793 A | | 3/1986 | Kane et al. |
| 4,955,034 A | | 9/1990 | Scerbak |
| 5,325,390 A | | 6/1994 | Tidwell |
| 5,619,522 A | | 4/1997 | Dube |
| 5,761,233 A | * | 6/1998 | Bruesselbach et al. ........ 372/72 |
| 5,960,022 A | | 9/1999 | Halldorsson et al. |
| 6,002,704 A | | 12/1999 | Freitag et al. |
| 6,081,542 A | | 6/2000 | Scaggs |
| 6,134,258 A | | 10/2000 | Tulloch et al. |
| 6,384,920 B1 | * | 5/2002 | Goltsos ....................... 356/601 |

FOREIGN PATENT DOCUMENTS

| | | |
|---|---|---|
| WO | WO 91/11042 A1 | 7/1991 |
| WO | WO 00/44073 A1 | 7/2000 |

OTHER PUBLICATIONS

Ziolek, et al.: "Diode–Pumped High Average–Power, High Repetition–Rate 2.94 μm Er: YAG Laser", Advanced Solid State Lasers Conference; Jan. 28, 2001; pp 99/MC6, 100/MC6–2 and 101/MC6–3; Published Seattle, Washington.

* cited by examiner

Primary Examiner—Jerome Jackson
Assistant Examiner—Joseph Nguyen
(74) Attorney, Agent, or Firm—Fitch, Even, Tabin & Flannery

(57) ABSTRACT

A solid-state laser device consists of a gain medium in the shape of a polyhedron. A beam enters the gain medium at one surface of the polyhedron and is reflected internally at one or more surfaces with each reflection occurring in approximate the same plane as the plane of incidence of the incident beam. The beam enters and exits the gain medium at different locations. Pump radiation enters the polyhedron through one or more faces. The laser device may be used as the gain medium for a laser oscillator or a laser amplifier. In one variation, the polyhedron contains an internal core section in which there is no gain material. In another variation, the gain medium further includes one or more surfaces oriented to achieve a 90 degree internal reflection of the beam.

31 Claims, 11 Drawing Sheets

DIODE-PUMPED SOLID-STATE LASER IN A POLYHEDRONAL GEOMETRY

BACKGROUND OF THE INVENTION

1. Field of the Invention

The present invention relates to the field of diode-pumped, solid-state laser systems, and more specifically, it relates to an improvement in the design of such systems to achieve an increase in the efficiency of energy extraction from such systems.

2. Description of Related Art

Advances in laser diode technology have resulted in multi-element diode bars capable of producing in excess of 80 Watts of continuous laser output. These advances have resulted in an explosion of diode-pumped solid-state lasers. Until very recently, diode-pumped solid-state lasers were classified as either end-pumped or side-pumped. End-pumped refers simply to those designs wherein the output of the laser diode pump source is coupled into the end of a laser rod [see FIG. 3]. The diode pump source 302 can be either a single emitter or an array. The diode output is relayed to the end of the laser rod 304 by either lenses (e.g., cylindrical lens 306 and spherical lens 308), fibers, mirrors or lens ducts. With an appropriate choice of coupling optics, the diode radiation can be concentrated principally into the lowest order, $TEM_{00}$, mode. Another choice of coupling optics can be designed to fill the end of the rod completely with the diode radiation channeled through the rod by total internal reflection from the rod barrel. Many of these designs employ lens ducts 402 to direct the diode radiation into the end of the laser rod 304 [as shown in FIG. 4]. End-pumped lasers are routinely available but high beam quality versions are limited to relatively low average power output.

Another common geometry for diode-pumped solid-state lasers is side pumping. In this configuration [as shown in FIGS. 5A and 5B] the diode light enters the laser medium through the barrel. There are numerous embodiments of this basic design: close-coupled, cavity filled and directed. In the close-coupled embodiment, the diodes (e.g., diode bars 502) are placed in close proximity to the laser medium (laser rod 504). Also, a cooling jacket 506 may surround the laser rod 504. In this configuration, the majority of the diode radiation enters the laser medium in spite of the large divergence of the diode light. The diode-pump radiation is distributed throughout the rod 504 but is often non-uniform due to the exponential absorption of the pump radiation.

Often side-pumped lasers will employ coupling optics 602 and a cavity surrounding the laser rod [as shown in FIG. 6]. In this cavity-filled embodiment, the diode laser radiation can make several passes through the laser medium (e.g., laser rod 504) since it is continually reflected by the reflector and cooling jacket 604 of the surrounding cavity. In the directed embodiment, the intervening optics between the diodes (e.g., diode bars 502) and the laser medium are designed to concentrate the diode radiation inside the laser rod 504. In this design, the diode-pump radiation typically makes a single-pass through the laser rod. Side-pumped laser designs offer a degree of simplicity but typically exhibit a low concentration of diode-pump radiation in the $TEM_{00}$ mode relative to end-pumped lasers. This is a result of the fact that the pumping radiation enters through the barrel of the rod thereby concentrating a large amount of energy around the periphery of the rod. Efficient energy extraction occurs principally from the interior of the laser medium. Hence, side-pumped geometries typically provide a lower energy extraction efficiency than end-pumped systems.

Several side-pumped designs attempt to overcome the limitation on extraction efficiency by reflecting the laser beam 702 off of the pump faces. Two of the most common designs are shown in FIGS. 7 and 8. In the design of FIG. 7, the beam 702 makes a zig-zag path through the laser medium 704 which is side-pumped by a conventional diode array 706. The side opposite the pump face is coated with a high reflective coating 708 to reflect the laser light back towards the pump surface. Once the prescribed number of reflections have occurred, the laser beam 702 strikes a region of the medium 704 which is anti-reflection coated to allow passage of the beam out of the crystal. Other embodiments of this design utilize fiber coupling of the diode radiation to the surface of the laser medium.

Another design which utilizes internal reflections of the laser beam 802 is shown in FIG. 8. In this design, the diode-pump radiation 706 is directed through optics 806 (e.g., a cylindrical lens 810 and a half wave plate 812) and enters a polished face of the laser medium 808 in a typical side-pumped geometry. The laser beam 802 makes a single, grazing incidence, total internal reflection off of the pump face 804. By grazing off of the pump surface, higher extraction efficiency can be achieved. However, this design is subject to significant beam aberration resulting from the thermal stress and distortion of the pump face.

Yet another design relying on total internal reflection is directed towards achieving a monolithic, diode-pumped unidirectional ring laser such as described in U.S. Pat. No. 4,578,793, of Kane et al., entitled SOLID STATE NON-PLANAR INTERNALLY REFLECTIVE RING LASER, which is incorporated herein by reference. In this design a non-planar ring laser is formed by polishing the reflecting surfaces out of plane [as shown in FIG. 9]. The beam 902 enters the base of the laser medium 904 where it refracts towards the first out of plane face 906. The beam reflects from this surface towards the top of the laser crystal. The beam reflects from the top surface towards the second out-of plane face 908 where it reflects again towards the entrance surface. The laser medium 904 is pumped from one surface 910. This design was introduced to provide a monolithic ring laser for unidirectional operation containing a polarizer, a half-wave plate and a Faraday Rotator. By placing this laser crystal inside a magnetic field, all three elements can be embodied in a single crystal. The out-of-plane reflections are enabling features of this design for achieving unidirectional, narrow frequency output. This design produces excellent single-frequency, unidirectional performance at low average power. These and similar designs are limited to low power operation due to thermally induced birefringence when the pump power is greater than approximately 100 W.

SUMMARY OF THE INVENTION

The present invention advantageously addresses the needs above as well as other needs by providing a solid state, polyhedronal laser having planar internal reflections, which is diode pumped and exhibits high extraction efficiency.

In one embodiment, the invention may be characterized as a laser device comprising a gain medium in the shape of a polyhedron. A beam enters the gain medium through one face of the polyhedron and is reflected internally at one or more surfaces with each reflection occurring in such a manner that the beam propagates within approximately the original plane of incidence. The beam enters and exits the gain medium at different locations.

In another embodiment, the invention may be characterized as a laser device comprising a gain medium in the shape of a polyhedron wherein a beam enters the gain medium through one face of the polyhedron and is reflected internally at one or more surfaces with each reflection occurring in such a manner that the beam propagates within approximately the original plane of incidence. The polyhedron contains an internal core section in which there is no gain material.

In a further embodiment, the invention may be characterized as a laser device comprising a gain medium in the shape of a polyhedron wherein a beam enters the gain medium through one face of the polyhedron and is reflected internally at one or more surfaces with each reflection occurring in such a manner that the beam propagates within approximately the original plane of incidence. At least one of the one or more surfaces are oriented at about 45 degrees with respect to the path of the beam.

DETAILED DESCRIPTION OF THE INVENTION

In one embodiment, the invention is a new type of diode-pumped solid-state laser, which can either be used internal to a laser cavity or as a stand alone amplifier external to any cavity. This embodiment achieves higher extraction efficiency than typical side-pumped configurations but enables substantially higher energy storage than conventional end-pumped systems. By introducing the pump radiation through several surfaces of a planar polyhedron, the high pumping efficiency associated with end-pumped systems can be achieved with a pump energy which could not otherwise be achieved from a single surface.

It is an objective of one embodiment of the present invention to provide a diode-pumped, solid-state laser which exhibits high extraction efficiency. Herein, the term laser device is meant to include the use of a laser medium either in an amplifier configuration or in a resonator configuration.

It is also an objective of one embodiment of the present invention to provide a solid-state laser which can operate at high average power in the TEM$_{00}$ mode by directing the laser beam through a series of reflections internal to the laser medium wherein the diode-pump radiation is directed through the reflecting surfaces.

Furthermore, different embodiments of the invention can be used either as the gain medium for a laser oscillator or as a laser amplifier.

As described previously, there are a multitude of geometries for diode-pumped laser sources (see FIGS. 3–9). These configurations all use variations of the end-pumped or side-pumped architecture. It is an objective of one embodiment of the present invention to provide a diode-pumped laser architecture which utilizes the high mode-matching efficiency of end-pumped configurations but also achieves higher gain and greater energy extraction than could be achieved from a conventional side-pumped or end-pumped laser rod or slab.

Figure 1:
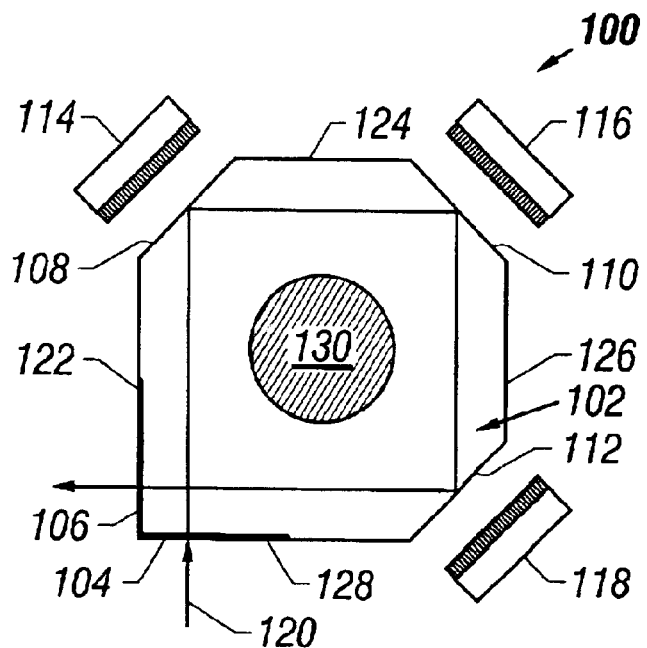
FIG. 1 illustrates one embodiment of the present invention. A laser device includes a polyhedronal gain medium shaped as a seven-sided planar polygon in cross section and is formed from 1.5% doped Nd:YAG and is pumped at the three internally reflecting surfaces by diode bars or arrays. The entrance and exit surfaces for the input laser beam include an anti-reflection coating.

According to one embodiment, the solid-state laser device includes a laser crystal 102 (the laser crystal 102 may also be referred to generically as a gain medium, a laser medium, or a laser material) which has been cut into the shape of a polyhedron having a planar polygonal cross section [as shown in FIG. 1]. The laser entrance 104 and exit faces 106 are polished as are the surfaces from which the laser beam will undergo reflection, e.g., reflecting surfaces 108, 110 and 112. The optical pump radiation provided by either single diodes or diode arrays, 114, 116, 118, enters the crystal 102 from a multitude of surfaces of the polyhedron. In one embodiment shown in FIG. 1, the diode pump radiation enters through the surfaces 108, 110 and 112 from which the beam will be reflected. These surfaces may be coated to minimize reflection at the wavelength of the diode radiation and to maximize reflection at the laser wavelength. The pump radiation enters these surfaces at near normal incidence. Optionally, optics may be included between the respective diode or diode array and the entrance face (or surface) to concentrate the pump radiation into the spatial region which will be struck by the laser beam 120.

In another embodiment, no relaying optics need be used at all between the diode array and the surface of the laser crystal. In this embodiment, the diode radiation is diverging as it enters the laser crystal 102. The diode radiation that is not absorbed by the active ions within the laser medium either continues into the medium or strikes the top and bottom of the laser crystal 102. Those rays that strike the top or bottom surfaces of the crystal 102 will be reflected back into the gain medium since their angle of incidence on the top or bottom surface is greater than the critical angle for total internal reflection.

In another embodiment, simple condensing optics such as a lens duct or simple mirrored surfaces can be used to concentrate the laser diode radiation on the surface of the laser crystal 102. In this embodiment, there is no attempt made to image the diode array onto the laser crystal but rather to simply direct those rays which would strike the crystal at a spatial location out of the extraction mode back into the optimum location. As a result of this concentration, the diode radiation may be utilized more efficiently in some circumstances.

The laser beam 120 enters the bottom face (i.e., entrance face 104) of the laser medium and passes through the laser medium towards the first reflecting surface [108]. In an alternate embodiment, the beam 120 is amplified along this path to the surface 108 by energy which has been stored in the medium by diodes (not shown) along crystal surface 122 which have side-pumped the laser crystal 102. As the beam 120 approaches the first reflecting surface 108, it experiences gain from the energy stored in the laser medium by the diode radiation which has entered through the first reflecting surface 108. Due to absorption of the pump radiation by the active species within the crystal 102, the population inversion will be decreasing with distance away from the face (e.g., reflecting surface 108) of the crystal 102. The laser beam 120 will experience an increasing gain as it approaches the reflecting surface 108. In this configuration, the beam 120 is effectively "end-pumped" by the diode array 114. The beam will reflect from the first reflecting surface 108 towards the second reflecting surface, e.g., surface 110. In one embodiment, the crystal is designed such that the beam strikes the first reflecting surface 108 at an angle greater than the critical angle for total internal reflection. In the preferred embodiment, the surface 108 is oriented at an angle of approximately 45 degrees relative to the path of the beam 120.

The now amplified laser beam continues towards the second reflecting surface 110. In one embodiment, the beam can be further amplified by side-pumping diodes (not shown) along crystal surface 124 as it travels towards the second reflecting surface 110. It is noted that in this embodiment, surface 124 is not intended to be used as a reflecting surface. As it strikes the second reflecting surface 110, the beam 120 is amplified by the population inversion created by the diode radiation which has entered the face of the second reflecting surface 110. In this configuration, the beam 120 is effectively "end-pumped" by the diode array 116. In the one embodiment, the crystal 102 is designed such that all rays experience the same overall gain after the second surface reflection. This is essential in order to minimize any amplitude distortion of the laser beam as it passes through the crystal 102. Phase distortion of the beam is minimized by orienting the reflecting surfaces such that the angle of incidence is as small as possible. An angle of incidence of 45 degrees results in an image inversion with all ray paths equal in the absence of any thermal effects in the crystal. The polyhedron is designed such that heat flow is principally one-dimensional transverse to the plane of incidence. As a result, phase distortion due to the temperature dependence of the refractive index and elongated paths resulting from thermal expansion is principally along a single axis resulting in simple astigmatism of the beam. This simple astigmatism is corrected by use of cylindrical lenses or mirrors which provide an increase in the optical path length along one axis in an amount to compensate that induced by the temperature dependence of the refractive index and thermal expansion in the laser medium.

Figure 2:
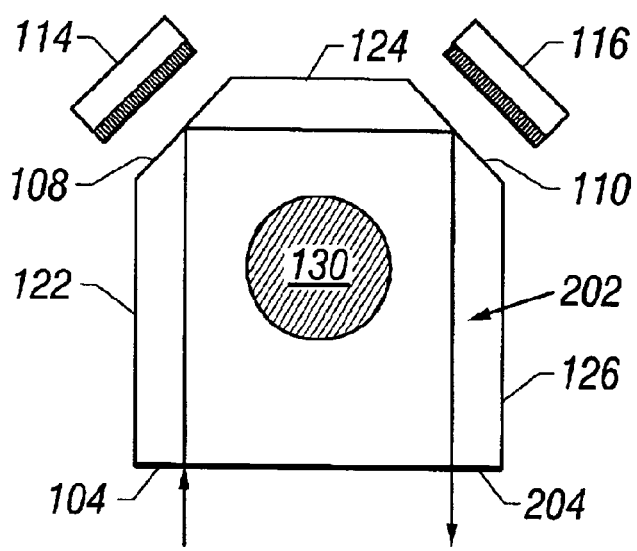
FIG. 2 illustrates another embodiment of the present invention. In this embodiment, the polyhedronal crystal is shaped as a six-sided planar polygon in cross section and is formed from 1.5% Nd:YAG and is pumped at the two internally reflecting surfaces by diode bars or arrays. The entrance and exit surfaces of the input laser beam also include an anti-reflection coating.
Figure 3:
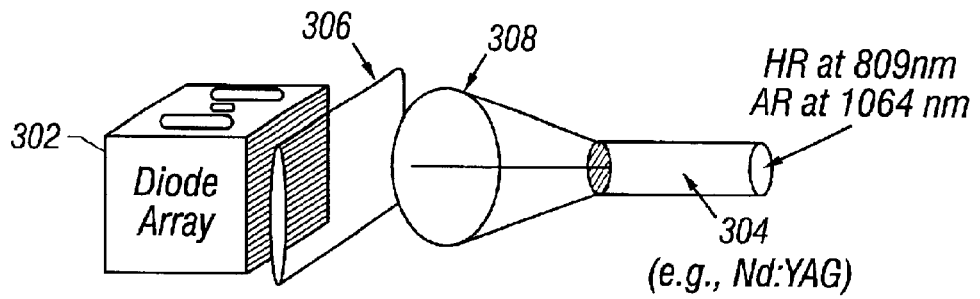
FIG. 3 illustrates an example of a conventional diode end-pumped laser where the diode output is directed to the end of the laser rod by lenses.
Figure 4:
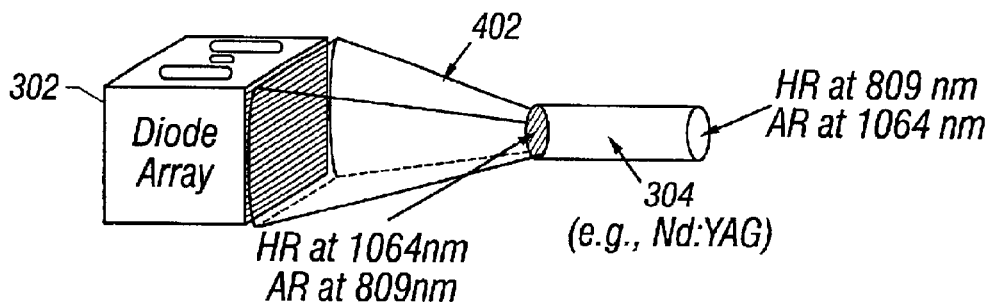
FIG. 4 illustrates an example of a conventional diode end-pumped laser where the diode output is directed to the end of the laser rod by means of a lens duct.
Figure 5A:
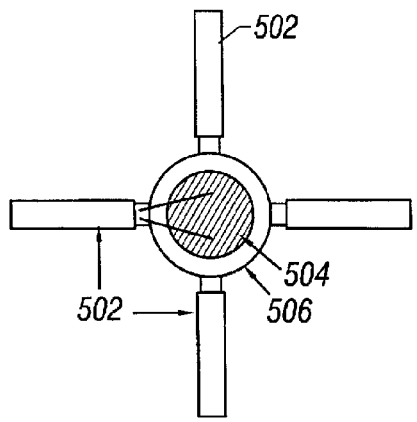
FIG. 5A illustrates an end view of a conventional diode side-pumped laser where the diode output enters the laser rod by free space propagation. This configuration is known as the close-coupled pumping geometry.
Figure 5B:
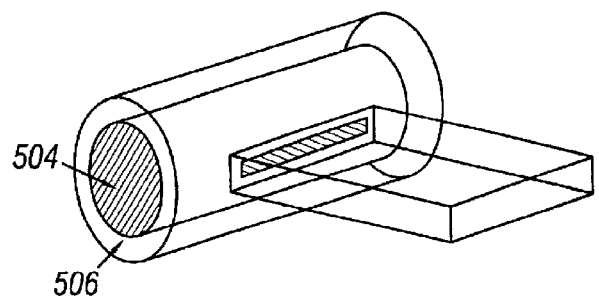
FIG. 5B illustrates a perspective view of a portion of the diode side pumped laser of FIG. 5A.
Figure 6:
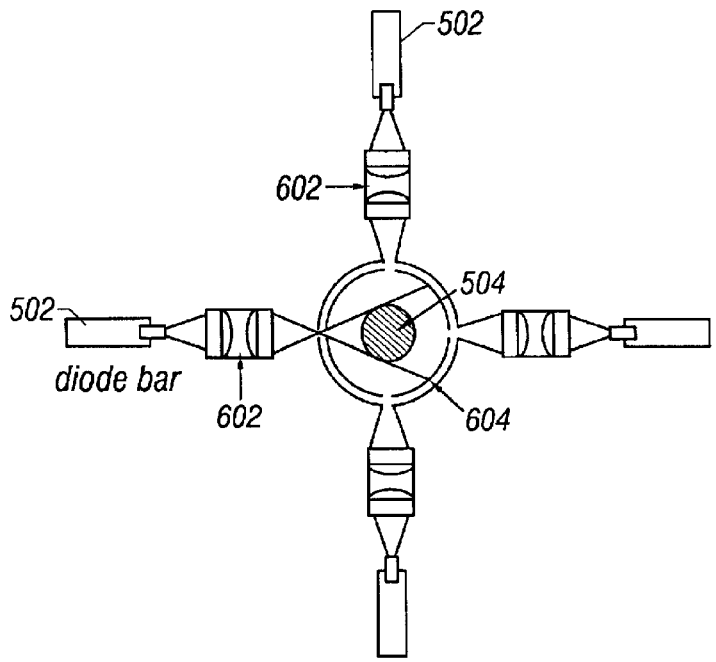
FIG. 6 illustrates an example of a conventional diode side-pumped laser where the diode output enters a reflecting cavity surrounding the laser rod. The diode output is focused through small entrance slits in the cavity by a set of lenses placed between the diodes and the cavity.
Figure 7:
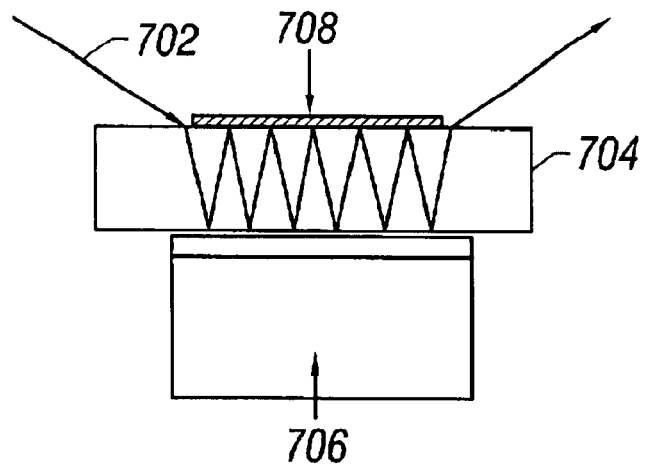
FIG. 7 illustrates an example of a conventional diode side-pumped zig-zag slab geometry.
Figure 8:
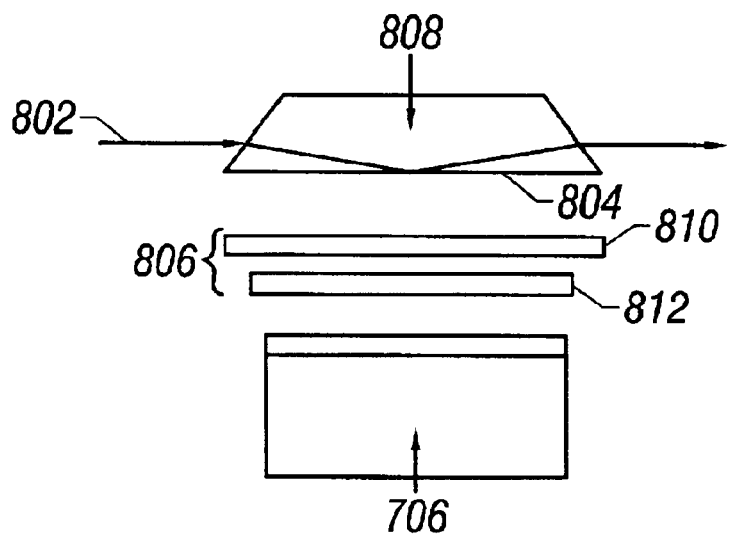
FIG. 8 illustrates an example of a conventional side-pumped grazing incidence geometry.
Figure 9:
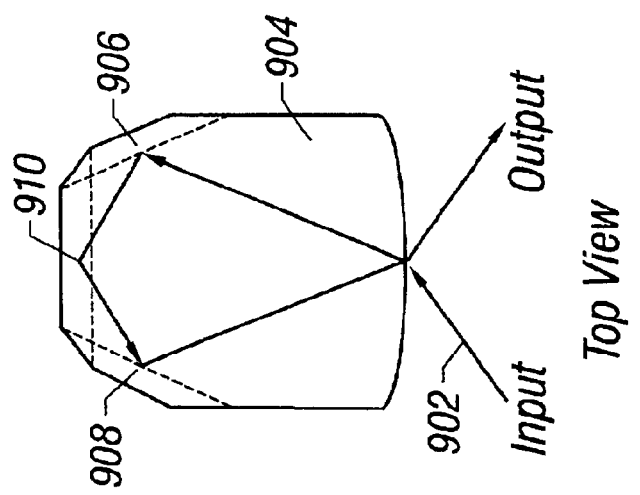
FIG. 9 illustrates an example of a conventional monolithic non-planar ring laser. The beam enters the crystal from the bottom face and makes several out of plane reflections. When placed within a magnetic field, this geometry can be used for unidirectional operation at low power.
Figure 9:
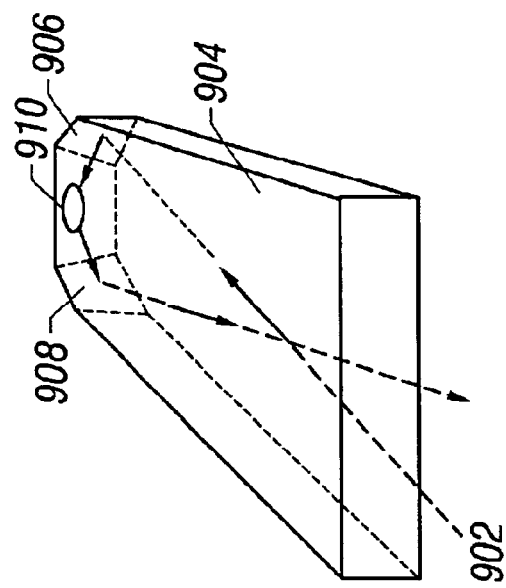

In the embodiment shown in FIG. 2, after reflection from the second surface 110, the beam is directed toward the exit face 204 or exit surface of the crystal. This face will typically be coated for minimum reflection (i.e., antireflection coated) for the laser wavelength at the appropriate angle of incidence. The beam passes through the exit face 204 and exits the crystal 202 in the direction opposite to that of the entrance beam. The entrance 104 and exit 204 of the laser beam occur on the same surface of the polygon but are spatially displaced at different locations. In the embodiment shown in FIG. 1, the beam makes a third reflection at the third reflecting surface, e.g., surface 112, and is directed towards an exit face 106 near the entrance location. However, the beam exits the crystal 102 at a large angle away from the entrance beam. In the embodiment shown in FIG. 1, the entrance and exit angles are separated by 90 degrees. This large angular separation enables simple means to separate the amplified beam from the seed beam. As such, the entrance location and the exit location are located on different surfaces of the polyhedronal crystal 102. It is also noted that the beam could also be side pumped by diode arrays (not shown) at surfaces 126 and 128.

The polyhedronal shape of the crystal 102 is designed to provide symmetric amplification and beam propagation. As a result, the laser gain medium is completely bi-directional meaning that it can be used to provide similar gain in either propagation direction. The beam 120 is reflected within the crystal within approximately the same plane as the incident beam, which is enabled in the planar polyhedral structure of the crystal 102. Furthermore, it is noted that the crystal may have a variety of specific configurations, the embodiments described herein shown by way of example. It is further noted that according to many embodiments, the geometry of the crystal 102 is designed such that the beam 120 does not propagate directly between parallel reflecting surfaces. In other words, the beam does not propagate between parallel reflecting surfaces without reflection from an intervening reflecting surface in between the parallel reflecting surfaces. By way of example, according to the embodiment illustated in FIG. 1, the beam 120 does not propagate directly between parallel reflecting surfaces 108 and 112 without first reflecting off of intervening reflecting surface 110, which is between parallel reflecting surfaces 108 and 112 in the beam path.

Furthermore, the crystal 102 also contains a core 130 (also referred to as a hole or a gap) internal to the crystal 102; thus, the core 130 may be referred to as an internal core section of the crystal. The core 130 is preferably located in a central region of the crystal, wherein the central region is defined as a central region of the plane of the crystal 102 that is co-planar with the plane of the laser beam path within the crystal. Additionally, the core 130 is a void portion of the crystal that contains no gain material. This core 130 can be vacated or contain other material which has no active laser ion. Such material could include flowing water, material which absorbs at the laser wavelength of interest or reflecting material such as a metal. The purpose of this core 130 is two-fold: first, it prevents parasitic laser oscillation and amplified spontaneous emission across the laser crystal 102, e.g., it prevents uncontrolled laser oscillation. Amplified spontaneous emission is that process by which spontaneously emitted radiation propagates through the crystal and is amplified. Such radiation can be trapped by internal reflections inside a laser crystal and build up to the point where it can deplete some of the population inversion produced by the pump radiation. This is detrimental to the performance of the laser. In the extreme case, this amplified spontaneous emission experiences sufficient gain to overcome losses within or at the surfaces of the laser medium. This results in parasitic oscillation within the crystal. Such oscillation will deplete the gain in those regions. By placing a core 130 or hole between the crystal faces, there is no path for amplification across the crystal 102. The only path for amplification is the principle path taken by the laser beam 120. The gain in this path is less than the reflectance at each of the laser entrance 104 and exit surfaces 106. As a result, parasitic oscillation is eliminated. The second purpose of the core 130 is to reflect any pump radiation which has not been absorbed back into regions of the crystal where extraction by the laser beam can occur. The surface of the core 130 can be polished, ground or even coated to provide reflectivity of the pump light. Any population inversion occurring in the interior of the polygon could not be accessed by the incident laser beam since there is no beam path across the crystal 102. Hence, by employing a means by which to reflect any pump energy which would normally travel into the interior of the crystal back into those areas traversed by the laser beam, the gain experienced by the beam will be increased and result in a more efficient utilization of the available pump power. The core 130 in the middle of the crystal is a simple means by which to accomplish this. Note that even if the surface of the core is ground, diffuse reflection from this surface will still provide a high degree of reflectance of the pump radiation back into extraction areas of the crystal.

In one embodiment, the core 130 is a cylinder that extends from a top surface to a bottom surface of the crystal and is formed within the polyhedronal crystal such that in a cross sectional view shown in FIGS. 1 and 2, the core 130 appears circular. It is noted that the core 130 may be embodied in a variety of geometries. For example, the core may have a number of sides and/or may not extend the full distance from the top surface to the bottom surface. For example, in one embodiment, the core may be a cavity formed entirely internal to the polyhedron such that it does not contact an external surface of the crystal.

Figure 10:
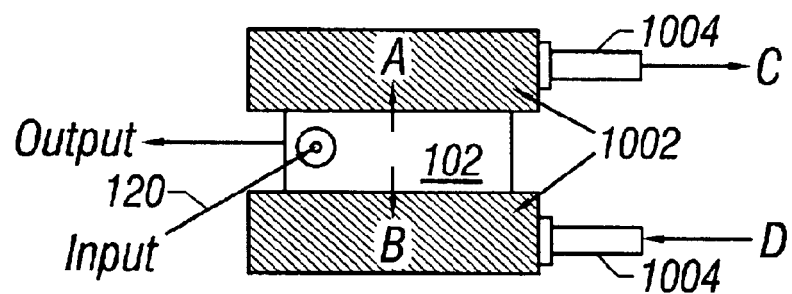
FIG. 10 illustrates a side-view of one embodiment of the present invention. The laser crystal is sandwiched between water-cooled copper heat sinks on the top and bottom. Arrows indicate the direction of primary heat flow.

A side-view of one embodiment of the invention of FIG. 1 is shown in FIG. 10. The laser crystal 102 is placed between two cooling plates 1002, which are in thermal and physical contact with the large area surfaces of the crystal 102. In one embodiment water-cooled copper heat sinks are used with 125 micron thick indium placed between the laser crystal 102 and the copper surface. For example, cooling water is pumped through cooling tubes 1004 as shown by Arrows C and D. The purpose of the indium is to provide a malleable material with high thermal conductivity which enables a high heat flow out of the laser crystal to the copper heat sink. Due to the malleability of indium, good physical contact between the copper/indium and laser surface can be achieved without placing undue stress on the laser crystal.

Heat flow out of the laser crystal 102 occurs principally in one dimension, i.e., through the top and bottom of the laser crystal as illustrated by Arrows A and B. Thus, advantageously, the direction of heat flow is in a plane transverse to the plane of beam propagation. The principally one-dimensional heat flow results in simple uniaxial astigmatism which can be corrected with a single compensating lens or mirror. Several embodiments of the invention are designed such that each of the plurality of rays of the beam traverse approximately the same distance within the gain medium.

Figure 11:
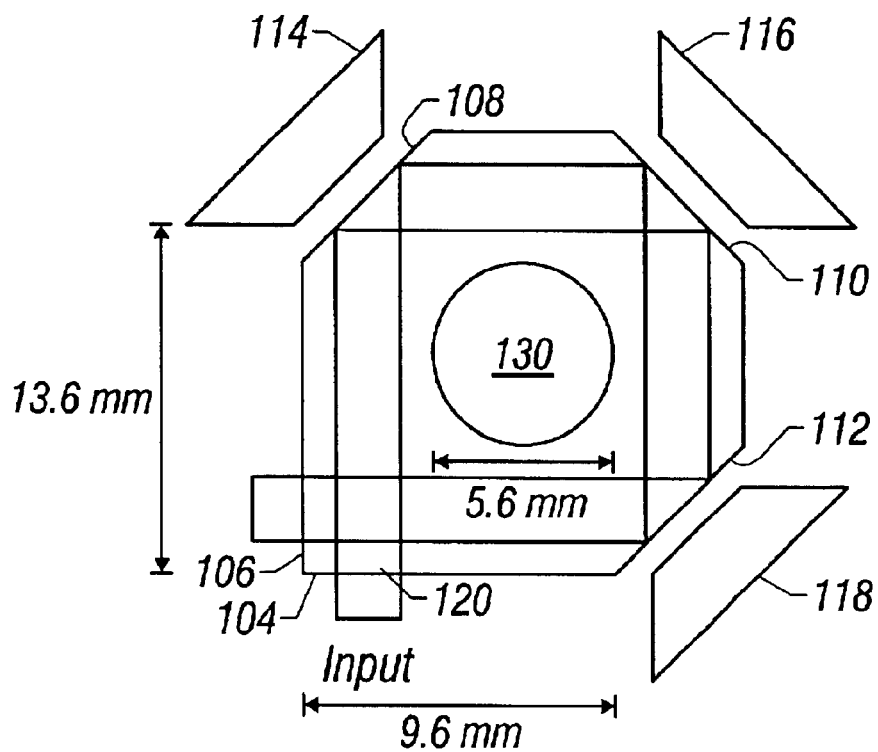
FIG. 11 illustrates a top view according to one embodiment of present invention showing density plot of light paths within the laser medium.

As an example, consider the specific embodiment shown in FIG. 11. Here, each face of the laser crystal is 5.6 mm×4 mm and the clear aperture for the beam is a 4 mm square. It can be pumped either by three diode bar assemblies (e.g., diode arrays 114, 116 and 118 through surfaces 108, 110 and 112) as shown or by five bar assemblies by adding an additional bar at each of the two unused faces (see FIG. 16). In either case, the arrangement is symmetric for the lateral dimension of the beam. The size was principally determined by the beam size for a 10 mJ pulse at 1.2 times saturation fluence in Nd:YAG. For the three bar geometry, each bar produces 100 W peak output at 808 nm. This diode radiation is concentrated onto the center 3×4.5 mm of the 4×5.6 mm surface, resulting in a peak irradiance at each surface of approximately 750 W/cm$^2$. The same design has been used for other materials such as Yb:YAG or Nd:YLF. For these cases, between 150 and 500 Watts of peak pump power are used from the diodes on each surface resulting in an irradiance of several kW/cm. Conventional single end-pumped designs would require as much as 4.5 times this irradiance to achieve the same level of stored energy resulting in severe thermal distortion of the pump face and possible fracture of the laser crystal. Even if the pump power is split in a double end-pumped design, there is still a significant advantage to the present invention where the irradiance is distributed over three or more surfaces.

To quantify the performance advantages of this design, a two-dimensional computer model was developed to calculate the distribution of the excited population density due to absorption of the pump light (assuming uniform illumination across the face) as well as saturated gain. The model also includes the decrease in excited population density due to spontaneous decay during the pump pulse because of the finite upper state lifetime. Further amplification of this spontaneous emission in neglected since the design inherently limits the gain×length product, which can be experienced by spontaneous emission. The decrease in population as the energy is extracted is calculated in order to allow the calculation of the gain for multiple passes. This is also used to calculate the difference in gain at reflection where portions of the beam travel through regions where the excited population has already been depleted. However, the effect of the beam overlap (resulting in a local increase in energy density) because of the non-zero pulse length at reflections has been neglected.

In order to illustrate the robustness of the design for different laser materials, the computer model was used to compare the relative performance of Nd:YAG, Nd:YLF, and Nd:YVO$_4$ with several Nd concentrations for each material. Material parameters for these three crystalline materials are given in Table 1.

TABLE 1

Material characteristics

| | Nd:YAG | Nd:YLF σ | Nd:YLF π | Nd:YVO$_4$ σ | Nd:YVO$_4$ π |
|---|---|---|---|---|---|
| Nd density (at 1 at. %) | $1.38 \times 10^{20}$ cm$^{-3}$ | $1.38 \times 10^{20}$ | | $1.25 \times 10^{20}$ | |
| Upper state lifetime | 230 μs | 520 μs | | 100 μs | |
| Lower state lifetime | <200 ps | 10 ns | | <200 ps | |
| Thermal cond. (W/cm-K) | .14 | .06 | | .05 | |
| Laser wavelength (nm) | 1064.1 | 1053 | 1047 | 1064.3 | 1064.3 |
| Index of refraction | 1.82 | 1.4481 | 1.4704 | 1.958 | 2.168 |
| Emission cross section | $2.8 \times 10^{-19}$ cm$^2$ | $1.2 \times 10^{-19}$ | $1.8 \times 10^{-19}$ | | $15.6 \times 10^{-19}$ |
| Absorption cross section | $2.9 \times 10^{-20}$ cm$^2$ | $2.2 \times 10^{-20}$ | $6.5 \times 10^{-20}$ | $8.4 \times 10^{-20}$ | $32.6 \times 10^{-20}$ |
| Absorption peak | 808 nm | 797 nm | 792 nm | 808 nm | 808 nm |
| Absorp. Coef (at 1%) | 4 cm$^{-1}$ | 3 cm$^{-1}$ | 9 cm$^{-1}$ | 10 cm$^{-1}$ | 40 cm$^{-1}$ |

Nd:YAG is the most commonly used of these three crystals. It has relatively high gain and is resistant to thermal fracture. The thermal conductivity is also relatively good. However, thermally induced birefringence can cause depolarization losses at high average power.

Neodymium vanadate, Nd:YVO$_4$, is birefringent and has very large absorption and emission cross sections. No data were available on the thermal conductivity, but vanadate is known to have issues with thermal lensing. The absorption bandwidth of vanadate is very large (approximately 20 nm) making it insensitive to changes in pump diode wavelength.

Nd:YLF is also birefringent and exhibits less thermal lensing than either Nd:YAG or Nd:YVO$_4$. However, it is structurally much weaker than YAG and, because of its reduced thermal conductivity, is more susceptible to thermal fracture. Thermal fracture will limit diode power to levels in this material. One relatively unusual issue with Nd:YLF is that it has a long lower state lifetime (approximately 10 ns) which will lead to bottlenecking for pulse lengths of this time scale or shorter.

For the comparative calculations presented in Table 2, a pump pulse (a square wave at 80 W) was assumed to uniformly fill each of the three 5.6 mm×4 mm pump faces. The input laser pulse was assumed to be a flattop of 2 mm diameter with a uniform fluence of 32 mJ/cm$^2$. This corresponds to 1 mJ in a circular beam. Also for these calculations, a three-level system was used to model Nd:YLF because of the long lower state lifetime. Previous measurements have indicated that the effect of this long lower-state lifetime is significant for amplified pulse lengths of even 15–20 ns.

TABLE 2

| Material | Nd:YAG | Nd:YAG | Nd:YLF | Nd:YLF | Nd:YVO(4) | Nd:YVO(4) |
|---|---|---|---|---|---|---|
| Doping | 0.01 | 0.01 | 0.01 | 0.01 | 0.01 | 0.01 |
| Upper state lifetime (μs) | 230 | 230 | 480 | 480 | 100 | 100 |
| Assumed lower lifetime (μs) | 0 | 0 | Inf | Inf | 0 | 0 |
| Shape | 7-gon | 7-gon | 7-gon | 7-gon | 7-gon | 7-gon |
| pump wavelength (nm) | 808 | 808 | 792 | 792 | 808 | 808 |
| pump polarization | na | na | P | p | s | s |
| Peak Pump power/face (W) | 80 | 80 | 80 | 80 | 80 | 80 |
| Avg. pump power/face (W) | 80 | 80 | 80 | 80 | 80 | 80 |
| Assumed pump area (cm$^2$) | 0.224 | 0.224 | 0.224 | 0.224 | 0.224 | 0.224 |
| emission wavelength (nm) | 1064 | 1064 | 1047 | 1047 | 1064 | 1064 |
| emission polarization | na | na | P | p | | |
| Rep Rate | 1000 | 3000 | 1000 | 3000 | 1000 | 3000 |
| Pump pulse length (s) | 0.001 | 0.000333 | 0.001 | 0.000333 | 0.001 | 0.000333 |
| sigma (e) | 2.8E-19 | 2.8E-19 | 1.80E-19 | 1.80E-19 | 1.56E-18 | 1.56E-18 |
| sigma (a) | 2.9E-20 | 2.9E-20 | 6.50E-20 | 6.50E-20 | 8.40E-20 | 8.40E-20 |
| N(0) | 1.38E+20 | 1.38E+20 | 1.38E+20 | 1.38E+20 | 1.25E+20 | 1.25E+20 |
| α | 4.0 | 4.0 | 9.0 | 9.0 | 10.5 | 10.5 |
| N(2) max | 1.30E+18 | 1.00E+18 | 5.00E+18 | 2.90E+18 | 1.45E+18 | 1.40E+18 |
| unsat. Sgl pass gain | 1.7 | 1.5 | 2.2 | 1.6 | 6.3 | 6.3 |
| Sgl pass gain | 1.7 | 1.5 | 2.2 | 1.6 | 3.6 | 3.5 |
| 4 pass gain | 5.2 | 3.8 | 8.8 | 4.2 | 6.2 | 6 |
| 8 pass gain | 9.2 | 6.8 | 11.6 | 6.5 | 6.2 | 6.1 |
| Fraction stored E in vol. | 51%| | 51% | 68% | 68% | 71% | 71% |
| Total E stored (mJ) | 41 | 32 | 76 | 44 | 18.5 | 17.9 |
| E extracted in 8 passes | 19.4 | 13.7 | 25.6 | 14.3 | 12.9 | 12.4 |
| Final Peak Fluence (J/cm$^2$) | 0.29 | 0.21 | 0.37 | 0.21 | 0.2 | 0.19 |
| Overall efficiency (opt-opt) | 8% | 17% | 11% | 18% | 5% | 16% |
| Storage efficiency | 22% | 53% | 42% | 73% | 10% | 29% |
| Rel. spatial uniformity | 8% | 8% | 5% | 5% | 6% | 6% |

Figure 12:
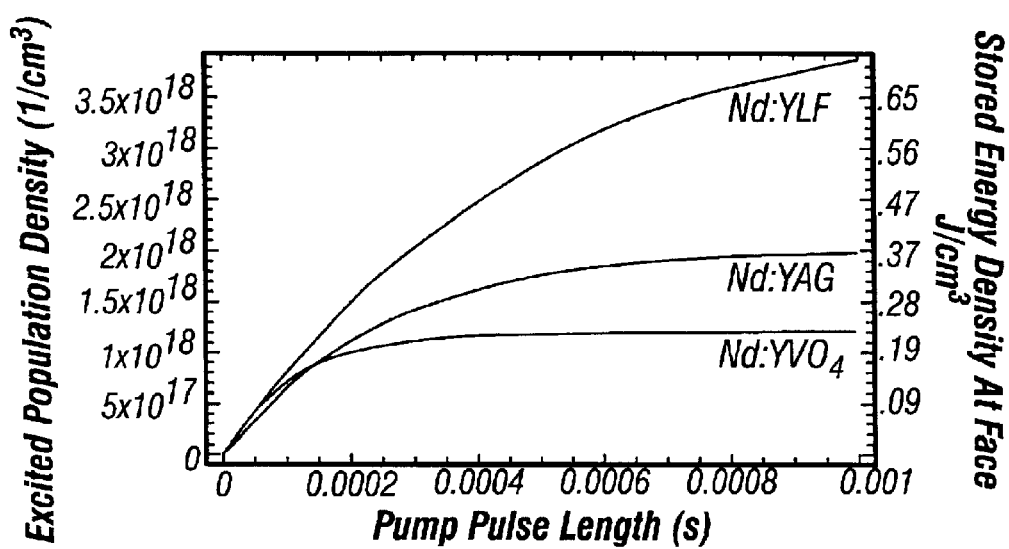
FIG. 12 is a graph is shown illustrating the excited population density at crystal face for three crystals types: Nd:YAG, Nd:YLF, and Nd:YVO$_4$ (80 W peak diode power and 1.5 at. % Nd).

First, the achievable gain is sensitive to the pump pulse length used, which for CW diodes is related to the repetition rate. FIG. 12 shows the calculated excited population density (and stored energy density) at the face of the crystal as a function of the length of the pump pulse. These curves saturate for times longer than approximately twice the upper state lifetime of the material in question. This indicates that energy deposited over time scales longer than this will have little effect on amplification and will go to either waste heat or to amplified spontaneous emission (ASE). This can be seen in Table 2 where the calculated stored energy decreases significantly as the pulse repetition rate is increased from 1 kHz to 3 kHz in YLF. The decrease is less dramatic in YAG, and almost negligible in $YVO_4$.

For a concentration of 1.5 at. % Neodymium in YAG, most of the stored energy is concentrated near the three pump faces of the crystal, with little excited population near the central core. Materials with a higher absorption coefficient (either by increased doping or higher absorption cross section) preferentially concentrate the stored energy nearer the face, with correspondingly less near the center. This is significant because the beam path in several embodiments of the current invention traverses the region near the pump faces, but not the region surrounding the central core. The percentage of the stored energy which lies within the region traversed by a 2 mm beam is indicated in Table 2 under "Fraction stored E in vol". This gain-mode volume overlap increases with the absorption coefficient from 47% for one pump polarization in Nd:YLF to 71% for $\pi$-polarized pump light in Nd:$YVO_4$.

In order to optimize the extraction efficiency, the spatial overlap between the laser mode and the gain region within the crystal should be large. However, when the spatial overlap is greater than approximately 75%, the gradient in the population density can impact the spatial distribution of the gain. Depletion of the population inversion across this gradient can result in amplitude distortion, particularly when the invention is used in a multipass geometry such as a regenerative amplifier. This effect can be minimized by selecting the appropriate doping of lasing ion in the crystal to yield maximum spatial overlap without unduly affecting the spatial uniformity of the gain. Table 2 shows the relative spatial uniformity after eight passes (except for Nd:$YVO_4$ which is after four passes). For typical Neodymium doping concentrations, the amplitude distortion is small (5–8% except for the case in $YVO_4$).

From these calculations, it is apparent that Nd:$YVO_4$ is preferred for high repetition rate applications, but it cannot store enough energy to achieve output pulse energies greater than approximately 10 mJ from the present crystal size and pump level. However, its high gain is useful to amplify low energy pulses in a few passes. There is little difference in the energy output between YAG and YLF for amplification of pulses less than approximately 5 nsec. This may appear surprising since YLF can store approximately twice as much energy as Nd:YAG due to the long upper-state lifetime. This is due principally to the buildup in population in the lower laser level of Nd:YLF for short-pulse (less than approximately 5 nanoseconds) operation. For longer pulse extraction, Nd:YLF would indeed yield a higher energy output. However, the lower yield strength of YLF will also subject it to thermal fracture for pump power exceeding approximately 100 W per face.

The use of Nd:YAG as the laser material to (e.g., for the laser crystal 102) will be used to further describe the present embodiment. Because of the upper state lifetime of 230 microseconds, pump pulse lengths longer than approximately 400–500 microseconds result only in lost efficiency and a higher heat load. This means that if continuous output diodes are used, the system should operate at repetition rates higher than 2.5 kHz. However, continuous output diodes are not yet available in powers greater than 60 W (for 1 cm long bars). Therefore for continuous output diodes, a multi-bar stack should be used to achieve a pump power exceeding this level. For pulsed operation at a repetition rate less than approximately 2.5 kHz, diode bars operated in a pulsed mode are preferable. In pulsed operation, current 1 cm diode bars can easily achieve a peak power output in excess of 100 W.

Figure 13A:
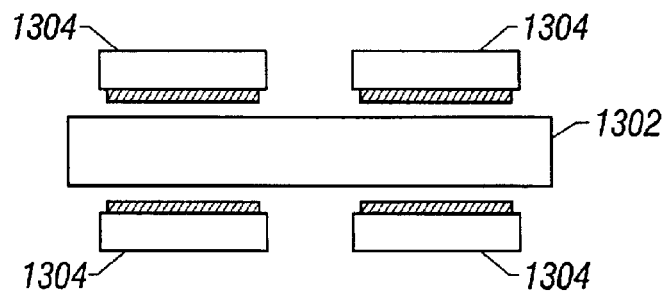
FIG. 13A is a diagram of a conventional side-pumped rod and diode placement.
Figure 13B:
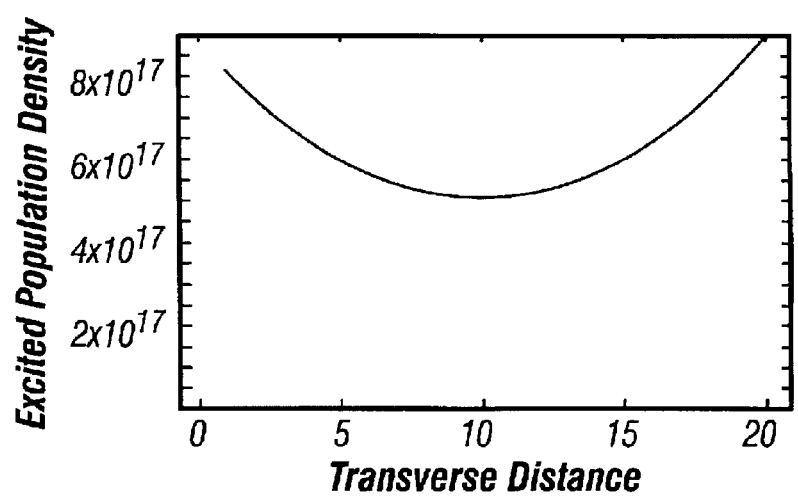
FIG. 13B is a graph illustrating the transverse distribution of excited population density.

It is instructive to compare the performance of this embodiment of the invention with that of a rod/slab design which is pumped on both sides by two diode bars 1304 as shown in FIG. 13A with the beam path down the center of the gain medium 1302. To maintain the same total pump power as used in the calculations discussed to this point, 60 W per bar (240 W total) was used in the calculation along with 1.5 at.% Nd concentration and a 1 ms pump pulse. Because the beam path is through the center of the medium 1302 while the highest population inversion density is near the sides, the overlap between the gain and mode volumes is poor (38%). This could be increased somewhat by reducing the Nd concentration, but a large portion of the pump energy would not be absorbed in the gain medium. The small signal single pass gain at the center of the beam for this configuration is 1.3. One factor causing this, is the pump diode light is not being concentrated in this case, resulting in the peak inversion density being only $9 \times 10^{17}$ cm$^{-3}$ at the side faces and $5 \times 10^{17}$ cm$^{-3}$ near the center (see FIG. 13B). The nonuniformity of the inversion density results in a corresponding variation in the spatial profile of the amplified beam of up to 13%.

Diode Coupling Geometries

As mentioned previously, there are several means by which to deliver the diode pump radiation to the face of the laser crystal. In order to avoid any adverse interactions with the crystal edges, the pump light should be delivered in approximately the central 85% of the pump face (e.g., reflecting surface 108). For the current 4×5.6 mm pump face, we have chosen to only fill an area of approximately 3×4.6 mm. The light emitted from a typical diode bar has a fast-axis divergence (in plane perpendicular to bar's long dimension) of approximately 35° FWHM from essentially a point source and a slow-axis divergence of approximately 10° FWHM from a 1 cm long line.

Figure 14A:
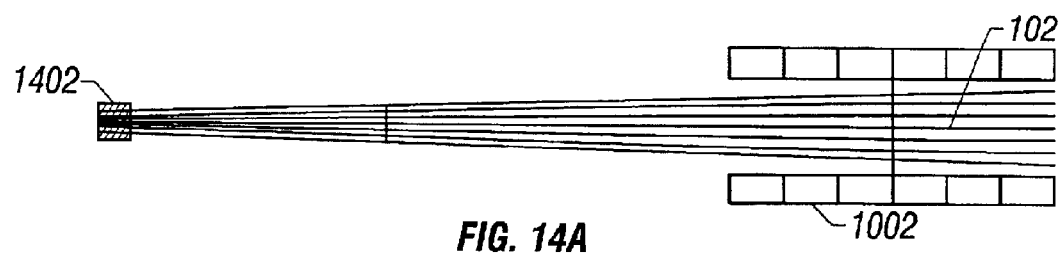
FIG. 14A is a side view of fast-axis expansion with microlens adjusted for 5 degree divergence. The spacing between the plates is 3 mm and the diode bar is 3 cm from the end.
Figure 14B:
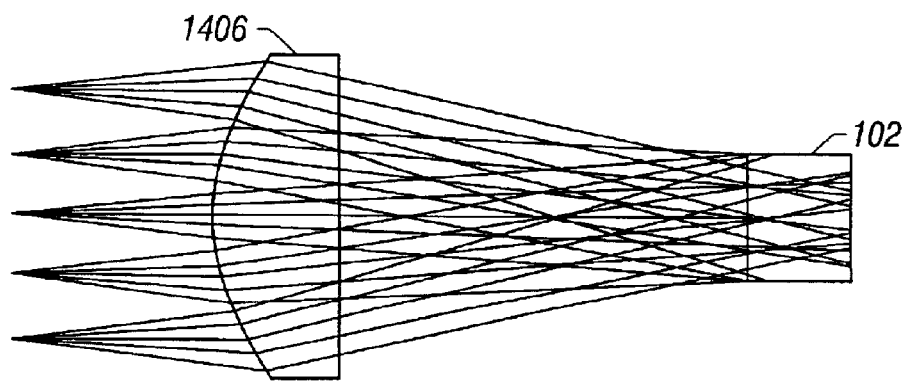
FIG. 14B is a top view is shown of the slow-axis (five points along the diode bar) with 22 mm focal length cylindrical lens and 3 cm separation between diode and the crystal face set at 5 mm width.

By using a pair of cylindrical lenses, the divergences of the two axes can be separately compensated to illuminate the pump face. However, the face will not be uniformly illuminated. For the fast axis, a lens is needed because the large divergence will expand to fill the 3 mm crystal face within 3 mm of travel from the diode bar which would not allow for a second lens to focus the slow axis. Instead, a wide (e.g., 1 cm), short focal length cylindrical lens should be placed close to the bar emitters. Conventional microlenses known to those skilled in the art are available for this purpose, but they are typically made to collimate the fast-axis to a beam size of approximately 0.8–0.9 mm which is too small for one embodiment of the present invention. One embodiment of the present invention utilizes custom microlenses. In another embodiment (FIG. 14A), a standard microlens 1402 is placed so as to only reduce the divergence of the fast-axis but not collimate it. A divergence of approximately 5°, full width at 1/$e^2$ can easily be achieved in this fashion. This method requires approximately 3 cm of travel beyond the microlens (1402 in FIG. 14A) in order for the fast axis of the pump radiation to expand to 3 mm before striking the surface of the crystal 102, which is bounded on the top and bottom surfaces by heat sinks 1002. For the slow axis, an approximately 22 mm focal length cylindrical lens (1406) is placed approximately 1 cm from the face of the microlens (FIG. 14*b*). This lens focuses the slow axis rays to a dimension of approximately 4.6 mm at the crystal face which is located approximately 3 cm from the face of the microlens. Standard ray trace techniques can be used to obtain an estimate of the range of focal lengths and positions to achieve this. The lens itself should be at least 12–13 mm in width in order to collect all of the light from the diode bar. A relatively long focal length (f=22 mm) was chosen to reduce the effect of spherical aberrations. FIG. 14b shows the ray trace analysis using this focal length lens onto the crystal face.

Figure 15:
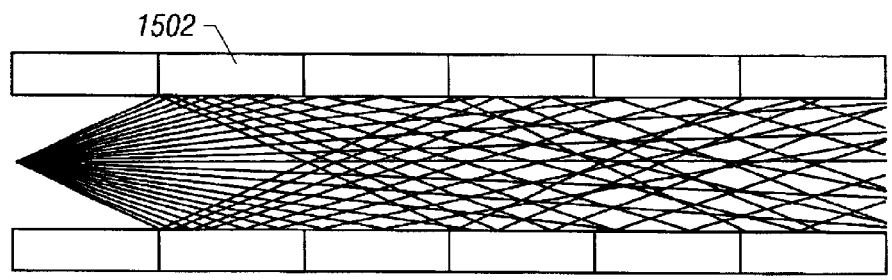
FIG. 15 is a side view of expansion of rays from a diode bar fast-axis with a reflective guide of width=3 mm (distance shown is 2 cm).

A disadvantage of using lenses is their cost, both in material and in effort required to position them within the required accuracy. We have used simple reflective surfaces as an alternative to lenses. This is illustrated in FIG. 15 which is a view of the fast axis expanding to the 3 mm pump face dimension. In this case, the standoff distance would be determined by the distance required to produce a homogeneous distribution of pump light after reflecting from the walls of the reflector surfaces. Standard ray trace algorithms are widely available to perform such calculations. In this case, the standoff would be determined by space required by the diodes. It would provide for a much more compact and inexpensive method of coupling the diode light. However, a potential problem is caused by the coherent nature of the diode light such that there may be interference patterns due to constructive and destructive interference. For the conditions described previously, gold coated metal reflecting surfaces which form an opening approximately 3 mm high by 12 mm wide should be placed approximately 1 mm from the face of a diode bar. The reflecting surfaces are approximately 3 cm long and culminate in an opening which is approximately 3 mm high and 4 mm wide. The small end of this reflecting light funnel is placed approximately 1 mm from the face of the laser crystal 102.

Figure 16:
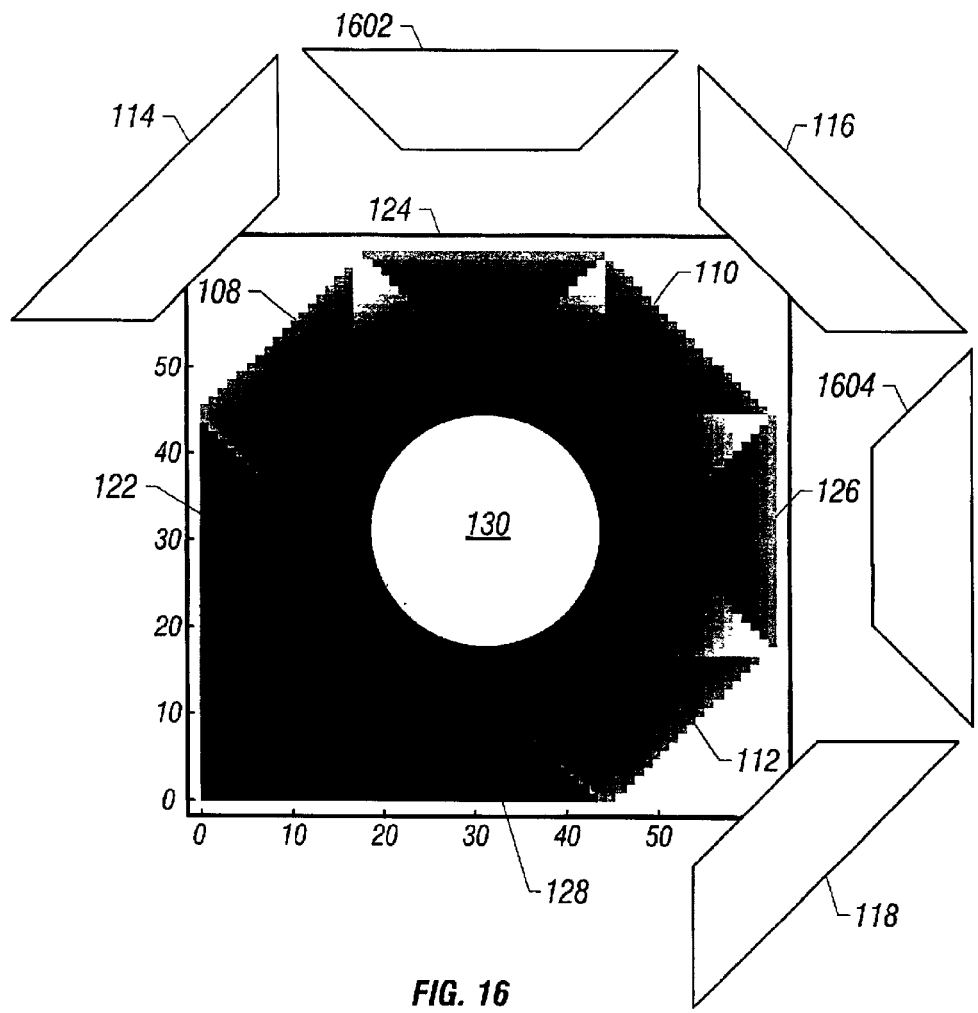
FIG. 16 is a diagram illustrating the spatial distribution of population for five pump sources at various surfaces of the laser crystal according to one embodiment of the invention.

As is illustrated in FIG. 16, additional diode pump sources (e.g., diode arrays 1602 and 1604) can be added on the unused sides (e.g., surfaces 124 and 126) if higher gain and/or energy output is required. These two faces 124 and 128 are pumped from the side. Due to the 90 degree reflection at the surface, the asymmetry in the gain distribution from the first side pumping (surface 124) is exactly countered by the second side (surface 126). For comparison, five 80W bars give a small signal, single pass gain of 2.2. When used as an amplifier and seeded with an approximately 0.1 to 1 millijoule input, this design can produce approximately 40 mJ of output after eight passes. The relative uniformity is less than 2% and the total stored energy is increased to 72 mJ. It is noted that in other embodiments, additional diode pump sources may be added to pump other unused sides (e.g., surfaces 122 and 128). Furthermore, in some embodiments, additional diode pump sources may be added to pump portions of the top and bottom surfaces of gain medium or crystal (i.e., the pump radiation enters the gain medium at surfaces which are parallel to the plane of incidence).

In the example given above for a flattop input beam, the peak output fluence after 8 passes is 500 mJ/cm$^2$ compared to the saturation fluence for Nd:YAG of 670 mJ/cm$^2$. However, for gaussian beams, the peak fluence is twice as large. In this case, with the added pump power, it is possible to increase the size of the crystal, allowing for larger amplified beams while still maintaining the same pump power density (and therefore, gain) as for the cases with three 80 W bars described previously.

Increasing the pump face dimensions to 10 mm×4 mm (24.1 mm overall width) removes the requirement for an optical element to match the slow-axis pump light to the crystal face. The small signal single pass gain with 400 W total pump power is 1.6 and a maximum of 38 mJ can be extracted in 16 passes. However, the beam in this case would have to be elliptical (approximately 2 mm×3.6 mm) to extract the maximum energy. To use a circular, 3.6 mm beam, the crystal thickness should be increased to 7.2 mm. In this case, the pump power should be increased also to 700 W. The increased thickness would allow for the use of a stacked array of 2–3 bars on each face.

All calculations have focused on flattop input beams in a two-dimensional model. This was for simplicity, and the comparison's made between the different configurations apply for other beam profiles. Use of gaussian modes will yield somewhat lower outputs than described previously.

Figure 17:
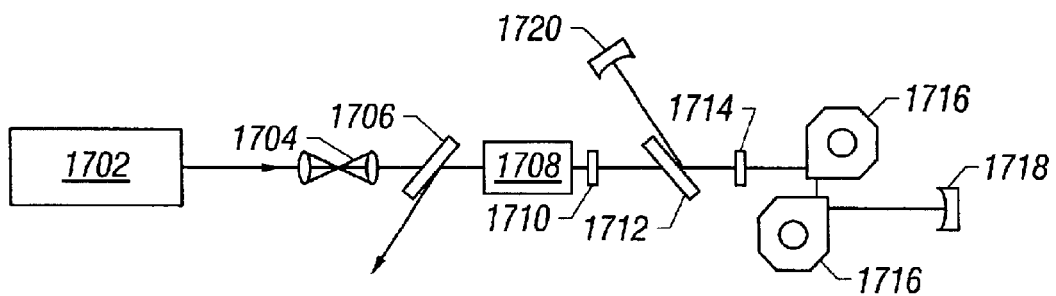
FIG. 17 illustrates a four-pass laser amplifier system utilizing one or more solid-state laser devices such as described in FIG. 1.

Referring next to FIG. 17, an application of the solid-state laser device as described above is shown in a four-pass amplifier. Here, the beam emerges from an oscillator 1702 producing a pulsed output at approximately a 1 kHz repetition rate. The beam passes through an expanding telescope 1704 to adjust the beam size to approximately 2 mm. The pulse then passes through a thin film polarizer 1706 oriented to pass P-polarization. The pulse then passes through a Faraday Rotator 1708, which rotates the polarization by 45 degrees. A half-waveplate or 45 degree quartz rotator 1716 cancels the rotation of the Faraday rotator 1708 orienting the beam back at P-polarization for passage through the second thin-film polarizer 1712. The beam then passes through a quarter-waveplate 1714 oriented to provide circular polarization at the output. The beam then passes through one or two laser heads 1716 as described according to several embodiments of the invention, whereby it undergoes amplification. After the first-pass of amplification, the beam strikes a mirror 1718, which directs it back through the gain medium for a second pass. The second pass through the quarter-waveplate 1714 converts the circularly polarized beam to linearly polarized in the S plane (vertical). The now S-polarized beam reflects off the thin film polarizer 1712 towards another mirror 1720. This mirror reflects the beam back through the waveplate and amplifier combination. The beam strikes the first mirror 1718 a second time and passes a fourth time through the amplifiers. Passage through the quarter-waveplate 1714 this time produces a linearly-polarized beam in the P (horizontal) plane which passes through thin-film polarizer 1712. The beam then encounters the half-waveplate 1710, which rotates the plane of polarization by 45 degrees. Passage through the Faraday rotator 1708 in the backwards direction rotates the polarization by an additional 45 degrees in the direction produced by the waveplate 1710. The Faraday rotator/waveplate combination serves to rotate the plane of polarization by 90 degrees when the beam is travelling backwards toward the oscillator. The now S-polarized beam then reflects off of thin-film polarizer 1706 and is directed out of the laser system. This is one of many possible uses of the present invention in a multipass amplifier. Similar uses of the invention as a single-pass amplifier, inside a regenerative amplifier design or as a the gain medium in an oscillator cavity are not intended to be precluded by this example.

Figure 18:
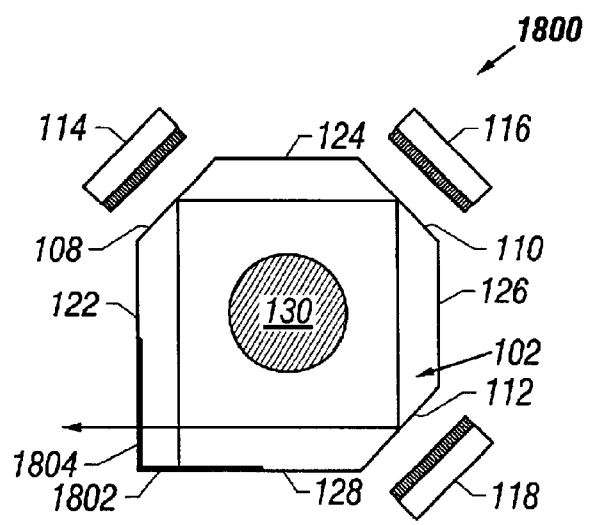
FIG. 18 illustrates a simple laser resonator according to another embodiment of the invention.

Referring next to FIG. 18, an application of the solid-state laser device as described herein is shown in a simple laser resonator. The laser resonator 1800 is similar to the embodiment of FIG. 1; however, the laser entrance 104 of FIG. 1 is replaced by a high reflector 1802 (HR) and the exit face 106 of FIG. 1 is coated so as to provide a partial reflectance. With this coating, surface 106 becomes a partially reflecting and partially transmitting surface which is known to those skilled in the art as an output coupler 1804. Note that there is no input beam as illustrated in FIG. 1 in the laser resonator 1800. Laser resonators are well known in the art. This simple resonator is only one of many embodiments of the invention. The mirrors (e.g., high reflector 1802 and output coupler 1804) which provide optical feedback can also be placed external to the gain medium. In this embodiment having external mirrors, the present invention would then be used as described and shown in FIG. 1, i.e., with anti-reflection coated surfaces for the beam input and the beam output.

Changes and modifications in the specifically described embodiments can be implemented without departing from the scope of the invention, which is intended to be limited only by the scope of the appended claims.

What is claimed is:

1. A laser device comprising:
a gain medium in the shape of a polyhedron in which a beam to be amplified enters the gain medium through one face of the polyhedron;
wherein the beam is reflected internally at two or more surfaces in a single pass through the gain medium with each reflection occurring in such a manner that the beam propagates within approximately the plane of incidence and does not propagate between parallel reflecting surfaces without reflection from an intervening reflecting surface in between the parallel reflecting surfaces; and,
wherein the beam enters and exits the gain medium at different locations.

2. The laser device of claim 1 wherein the different locations are on one surface of the polyhedron.

3. The laser device of claim 1 wherein the different locations are on different surfaces of the polyhedron.

4. The laser device of claim 1 in which optical pump radiation enters the gain medium through the one or more surfaces from which the beam will be reflected.

5. The laser device of claim 1 in which optical pump radiation enters the gain medium through one or more surfaces from which the beam will not be reflected.

6. The laser device of claim 1 in which the optical pump radiation enters the gain medium through one or more surfaces of the polyhedron which are approximately parallel to the plane of incidence.

7. The laser device of claim 1 in which the optical pump radiation enters the gain medium through one or more surfaces of the polyhedron which are approximately perpendicular to the plane of incidence.

8. The laser device of claim 1 further comprising heat sinks coupled to external surfaces of the gain medium.

9. The laser device of claim 8 wherein the flow of heat from the gain material is generally within a plane transverse to the plane of incidence.

10. The laser device of claim 1 wherein at least one of the one or more surfaces are oriented at approximately 45 degrees with respect to the path of the beam.

11. A laser device comprising:
a gain medium in the shape of a polyhedron in which a beam to be amplified enters the gain medium through one face of the polyhedron;
wherein the beam is reflected internally at one or more surfaces with each reflection occurring in such a manner that the beam propagates within approximately the original plane of incidence; and,
wherein the polyhedron contains an internal core section in which there is no gain material.

12. The laser device of claim 11 wherein the beam enters and exits the gain medium at different locations, wherein the different locations are on one surface of the polyhedron.

13. The laser device of claim 11 in which the internal core section is in a geometry which prevents uncontrolled laser oscillation.

14. The laser device of claim 11 in which a surface of the internal core section reflects pump radiation back towards a portion of the gain medium through which the laser beam will pass.

15. The laser device of claim 11 wherein the beam enters and exits the gain medium at different locations, wherein the different locations are on different surfaces of the polyhedron.

16. The laser device of claim 11 in which the optical pump radiation enters the gain medium through one or more surfaces from which the beam will be reflected.

17. The laser device of claim 11 in which the optical pump radiation enters the gain medium through one or more surfaces of the polyhedron which are approximately parallel to the plane of incidence.

18. The laser device of claim 11 in which the optical pump radiation enters the gain medium through one or more surfaces of the polyhedron which are approximately perpendicular to the plane of incidence.

19. The laser device of claim 11 in which optical pump radiation enters the gain medium through one or more surfaces from which the beam will not be reflected.

20. The laser device of claim 11 further comprising heat sinks coupled to external surfaces of the gain medium.

21. The laser device of claim 20 wherein the flow of heat from the gain material is generally within a plane transverse to the plane of incidence.

22. The laser device of claim 11 wherein at least one of the one or more surfaces are oriented at approximately 45 degrees with respect to the path of the beam.

23. A laser device comprising:
a gain medium in the shape of a polyhedron in which a beam to be amplified enters the gain medium through one face of the polyhedron;
wherein the beam is reflected internally at two or more surfaces in a single pass through the gain medium with each reflection occurring in such a manner that the beam propagates within approximately the original plane of incidence and does not propagate between parallel reflecting surfaces without reflection from an intervening reflecting surface in between the parallel reflecting surfaces; and,
wherein at least one of the one or more surfaces are oriented at about 45 degrees with respect to the path of the beam.

24. The laser device of claim 23 wherein the beam enters and exits the gain medium at different locations, wherein the different locations are on one surface of the polyhedron.

25. The laser device of claim 23 wherein the beam enters and exits the gain medium at different locations, wherein the different locations are on different surfaces of the polyhedron.

26. The laser device of claim 23 in which the optical pump radiation enters the gain medium through one or more surfaces of the polyhedron which are approximately parallel to the plane of incidence.

27. The laser device of claim 23 in which the optical pump radiation enters the gain medium through one or more surfaces of the polyhedron which are approximately perpendicular to the plane of incidence.

28. The laser device of claim 23 in which optical pump radiation enters the gain medium through one or more surfaces from which the beam will not be reflected.

29. The laser device of claim 23 in which optical pump radiation enters the gain medium through one or more surfaces from which the beam will be reflected.

30. The laser device of claim 23 further comprising heat sinks coupled to external surfaces of the gain medium.

31. The laser device of claim 30 wherein the flow of heat from the gain material is generally within a plane transverse to the plane of incidence.

* * * * *

UNITED STATES PATENT AND TRADEMARK OFFICE
CERTIFICATE OF CORRECTION

PATENT NO. : 6,865,213 B2
DATED : March 8, 2005
INVENTOR(S) : Michael Perry et al.

It is certified that error appears in the above-identified patent and that said Letters Patent is hereby corrected as shown below:

Column 15,
Lines 28 and 32, after "which" delete "the"; and

Column 16,
Lines 1, 4, 8, 46 and 50, after "which" delete "the".

Signed and Sealed this

Seventh Day of June, 2005

JON W. DUDAS
*Director of the United States Patent and Trademark Office*